United States Patent
Ko et al.

(10) Patent No.: US 11,841,813 B2
(45) Date of Patent: Dec. 12, 2023

(54) SYSTEM AND METHOD FOR EFFICIENT COMMUNICATION BUS ARBITRATION

(71) Applicant: ROBOTIS CO., LTD., Seoul (KR)

(72) Inventors: Young Jun Ko, Seoul (KR); Soo Kyung Son, Gimpo-si (KR); Dae Sung Choi, Bucheon-si (KR); Hee Il Kim, Suwon-si (KR); Byoung Soo Kim, Seoul (KR); In Yong Ha, Seoul (KR)

(73) Assignee: ROBOTIS CO., LTD., Seoul (KR)

( * ) Notice: Subject to any disclaimer, the term of this patent is extended or adjusted under 35 U.S.C. 154(b) by 0 days.

(21) Appl. No.: 17/736,525

(22) Filed: May 4, 2022

(65) Prior Publication Data
US 2022/0261368 A1 Aug. 18, 2022

Related U.S. Application Data

(63) Continuation of application No. PCT/KR2019/015169, filed on Nov. 8, 2019.

(30) Foreign Application Priority Data

Nov. 6, 2019 (KR) .......................... 10-2019-0141050

(51) Int. Cl.
*G06F 13/366* (2006.01)

(52) U.S. Cl.
CPC .................................. *G06F 13/366* (2013.01)

(58) Field of Classification Search
CPC ......... G06F 13/366; H04L 9/40; H04L 12/40; H04L 12/40084; H04L 12/40071; H04L 12/40169; H04L 12/40195
See application file for complete search history.

(56) References Cited

U.S. PATENT DOCUMENTS

| | | | | |
|---|---|---|---|---|
| 6,728,908 B1* | 4/2004 | Fukuhara | ............... | H04L 1/0061 714/48 |
| 6,963,944 B1* | 11/2005 | Rettig | ................... | H04L 12/403 710/110 |
| 7,650,441 B2* | 1/2010 | Lee | ..................... | G06F 13/4291 710/5 |
| 10,496,562 B1* | 12/2019 | Graif | .................... | G06F 13/4291 |
| 2003/0061293 A1* | 3/2003 | Steindl | ............... | G05B 19/4185 709/208 |

(Continued)

FOREIGN PATENT DOCUMENTS

| KR | 1020060017035 A | 2/2006 |
|---|---|---|
| KR | 1020130045690 A | 5/2013 |

(Continued)

OTHER PUBLICATIONS

International Search Report of PCT/KR2019/015169 dated Jul. 30, 2020.

*Primary Examiner* — Faisal M Zaman
(74) *Attorney, Agent, or Firm* — Dinsmore & Shohl LLP

(57) ABSTRACT

A system and method for efficient communication bus arbitration in a communication protocol are provided. The system and method for efficient communication bus arbitration are a system and method for slave communication bus arbitration in multi-drop communication, and provide efficient and fast communication speed by improving the packet structure in a manner in which a slave controller sequentially responds to a query of a master controller.

4 Claims, 7 Drawing Sheets

(56) References Cited

U.S. PATENT DOCUMENTS

| | | | | |
|---|---|---|---|---|
| 2009/0144471 | A1* | 6/2009 | Lin | G06F 13/4252 |
| | | | | 710/110 |
| 2012/0079153 | A1* | 3/2012 | Flandre | H04L 12/403 |
| | | | | 710/110 |
| 2012/0084378 | A1* | 4/2012 | Kaneko | G06F 15/16 |
| | | | | 709/208 |
| 2012/0137034 | A1* | 5/2012 | Kaneko | G06F 13/4286 |
| | | | | 710/110 |
| 2013/0034132 | A1* | 2/2013 | Kaneko | H04L 12/40039 |
| | | | | 375/219 |
| 2013/0117483 | A1* | 5/2013 | Boeck | G06F 13/364 |
| | | | | 710/110 |
| 2014/0025185 | A1* | 1/2014 | Miyazaki | G05B 19/414 |
| | | | | 700/3 |
| 2016/0036608 | A1* | 2/2016 | Lee | H04L 25/4921 |
| | | | | 375/295 |
| 2016/0134553 | A1* | 5/2016 | Kim | H04L 43/0811 |
| | | | | 370/254 |
| 2016/0306759 | A1* | 10/2016 | Ham | H04L 12/403 |
| 2017/0046292 | A1* | 2/2017 | Teuke | H04L 12/40169 |
| 2018/0203818 | A1* | 7/2018 | Fukuda | G05B 15/02 |
| 2019/0165968 | A1* | 5/2019 | Nakajima | H04J 3/00 |
| 2019/0188174 | A1* | 6/2019 | Raja | G06F 13/423 |
| 2019/0385057 | A1* | 12/2019 | Litichever | H04L 63/14 |
| 2020/0287743 | A1* | 9/2020 | Mangin | G06F 13/4213 |
| 2021/0063989 | A1* | 3/2021 | Taniguchi | G05B 19/05 |
| 2021/0173717 | A1* | 6/2021 | Schmitz | H04L 12/40045 |
| 2022/0350773 | A1* | 11/2022 | Ryan | H04L 12/413 |

FOREIGN PATENT DOCUMENTS

| | | |
|---|---|---|
| KR | 101400329 B1 | 5/2014 |
| KR | 1020140064267 A | 5/2014 |
| KR | 101704423 B1 | 2/2017 |

* cited by examiner

<Instruction>

<Status #1>

<Status #2>

<Status #3>

<Instruction>

<Status #1>

<Status #2>

<Status #3>

SYSTEM AND METHOD FOR EFFICIENT COMMUNICATION BUS ARBITRATION

CROSS-REFERENCE TO RELATED APPLICATIONS

This application is a continuation of International Application No. PCT/KR2019/015169 filed on Nov. 8, 2019, which claims priority to Korean Patent Application No. 10-2019-0141050 filed on Nov. 6, 2019, the entire contents of which are herein incorporated by reference.

TECHNICAL FIELD

The present disclosure relates to a system and method for efficient communication bus arbitration in a communication protocol, and more particularly, to a system and method for a slave communication bus arbitration in a multi-drop communication, in which, in a type in which a slave controller sequentially responds to a query of a master, the system and method for communication bus arbitration provide an efficient and fast communication speed by improving a structure of a packet.

BACKGROUND ART

Half duplex refers to a type of communication in which one side sends while the other side receives, and the direction of transmission is reversed. The master/slave type sensor network is a representative example. For multi-drop communication in serial communication, arbitration of the communication line is required. In the case of master/slave controller communication, the master controller is generally responsible for this role (master bus arbitration). Meanwhile, in order for the master controller to receive information from several slave controllers at once, a slave bus arbitration method is also used, in which multiple slave controllers respond to a single query. According to the slave bus arbitration method, for the half duplex configured in a multi-drop scenario in which one master controller and several slave controllers communicate with each other, each slave controller has different IDs from each other, and the master controller applies the IDs to the communication packets to communicate with each slave controller. At this time, when there is no request from the master controller, the slave controller does not occupy the serial communication line and waits for reception.

The slave bus arbitration method can increase the communication speed by reducing the number of queries, but because each response packet is formed of a header and a tail, elements other than the data required by the master controller still occupy a considerable proportion of the packet. More specifically, a packet of a general communication protocol is formed of a header area, a data area, and a tail area. The header area indicates the start of the packet, and the tail area indicates the end of the packet and depending on circumstances, may be used for integrity verification. For example, for the integrity verification, a checksum, CRC method, and the like may be used.

Again, the slave bus arbitration method increases the communication speed by reducing the number of queries, but the master controller needs to check the header area and the tail area as many as the number of response slave controllers, and elements other than the data still takes up a considerable proportion of the packet.

The background art of the present disclosure is disclosed in Korean Registered Patent No. 10-2013-0045690.

SUMMARY

Technical Problem

The present disclosure provides a system and method for efficient communication bus arbitration, which increase communication speed by reducing the number of occurrences of header and tail areas in a slave bus arbitration method.

The present disclosure provides a system and method for efficient communication bus arbitration, which increase communication speed by improving packets that are repeatedly generated for every transmission from a slave controller in the slave bus arbitration method.

Technical Solution

According to one aspect of the present disclosure, there is provided an efficient communication bus arbitration system.

According to an embodiment of the present disclosure, an efficient communication bus arbitration system is an efficient communication bus arbitration system in which a plurality of slave controllers sequentially transmit packets according to a predetermined priority, and the system may include one or more slave controllers each having an individual identifier (ID), a master controller that applies the identifier (ID) of the slave controller to a communication packet to communicate, and a communication bus that connects the master controller and the slave controllers in a multi-drop method and transmits and receives packets, in which the slave controllers may respond to the master slave in a predetermined order, a first slave controller with a highest priority may transmit a packet including a header area and a first data area, second to (N−1)th slave controllers may transmit packets including second to (N−1)th data areas, respectively, and a last (N)th slave controller may transmit a packet including an (N)th data area and a tail area.

According to another aspect of the present disclosure, there may be provided an efficient communication bus arbitration method and a computer-readable recording medium recording a computer program for executing the method.

The method and recording medium according to an embodiment of the present disclosure may be an efficient communication bus arbitration method in which a plurality of slave controllers sequentially transmit packets according to a predetermined priority, and the method may include transmitting, by a first slave controller with a highest priority, a packet including a header area and a first data area, transmitting, by second to (N−1)th slave controllers, packets including second to (N−1)th data areas, respectively, and transmitting, by a last (N)th slave controller, a packet including an (N)th data area and a tail area.

Effects of Invention

According to an embodiment of the present disclosure, it is possible to expect efficient and fast communication by improving repeatedly occurring packets by reducing the number of occurrences of the header and tail areas in the slave bus arbitration communication.

DETAILED DESCRIPTION

Figure 1:
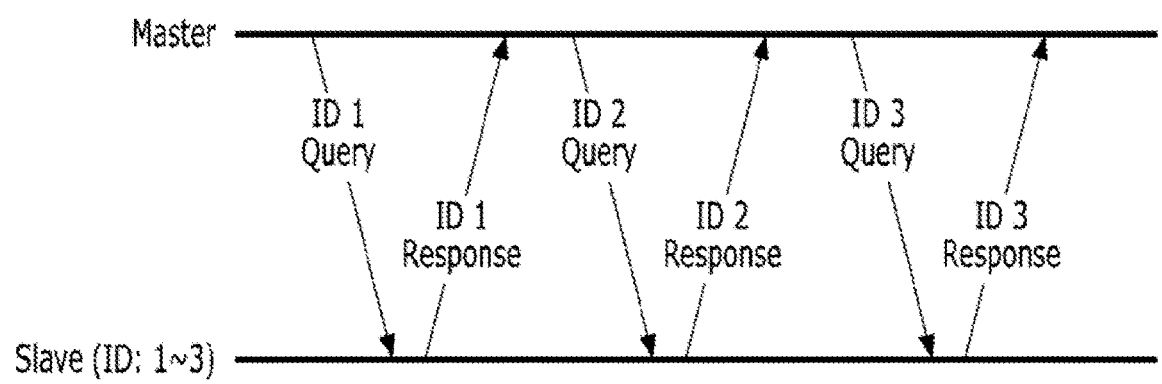
FIG. 1 is a diagram for explaining a slave bus communication method according to an embodiment of the present disclosure.

Since the present disclosure can have various modifications and various embodiments, certain embodiments are illustrated in the drawings by way of examples and will be described in detail through detailed description. However, it should be understood that the disclosure is not to be limited to specific embodiments, but includes all modifications, equivalents, and alternatives falling within the spirit and scope of the disclosure. In describing the present disclosure, when it is determined that a detailed description of a related known technology may unnecessarily obscure the gist of the present disclosure, the detailed description thereof will be omitted. In addition, a singular expression used in the description and the claims should generally be construed to mean "one or more" unless stated otherwise.

Hereinafter, preferred embodiments of the present disclosure will be described in detail with reference to the accompanying drawings, and in the description with reference to the accompanying drawings, the same or corresponding components are given the same reference numerals, and redundant descriptions thereof will be omitted.

FIG. 1 is a diagram for explaining a master bus arbitration method in a related multi-drop method.

Referring to FIG. 1, according to the master bus arbitration method, when a master controller requests information from a plurality of slave controllers, the process of asking each slave controller and answering is continuously repeated.

On the other hand, according to a slave bus arbitration method according to an embodiment of the present disclosure, the master controller is not required to be assigned the mastership of the communication bus every time, and the master controller transmits command packets without specifying the ID of the slave controller. In response to these command packets, the slave controller occupies the communication bus according to the predetermined priority and transmits the status packet. That is, with a single query, a plurality of slave controllers can respond sequentially according to a predetermined priority. According to the slave bus arbitration method, a slave controller having next priority responds after checking the response of the slave controller having preceding priority, in which the slave controller having the next priority waits for its turn to respond according to the predetermined priority and can respond in turn. Rather than consuming search time by querying as many as the number of slaves to receive responses from a plurality of slave controllers, the slave bus arbitration method can shorten the search time by the master controller sequentially receiving responses with a single query from a plurality of slave controllers according to a predetermined priority.

Figure 2:
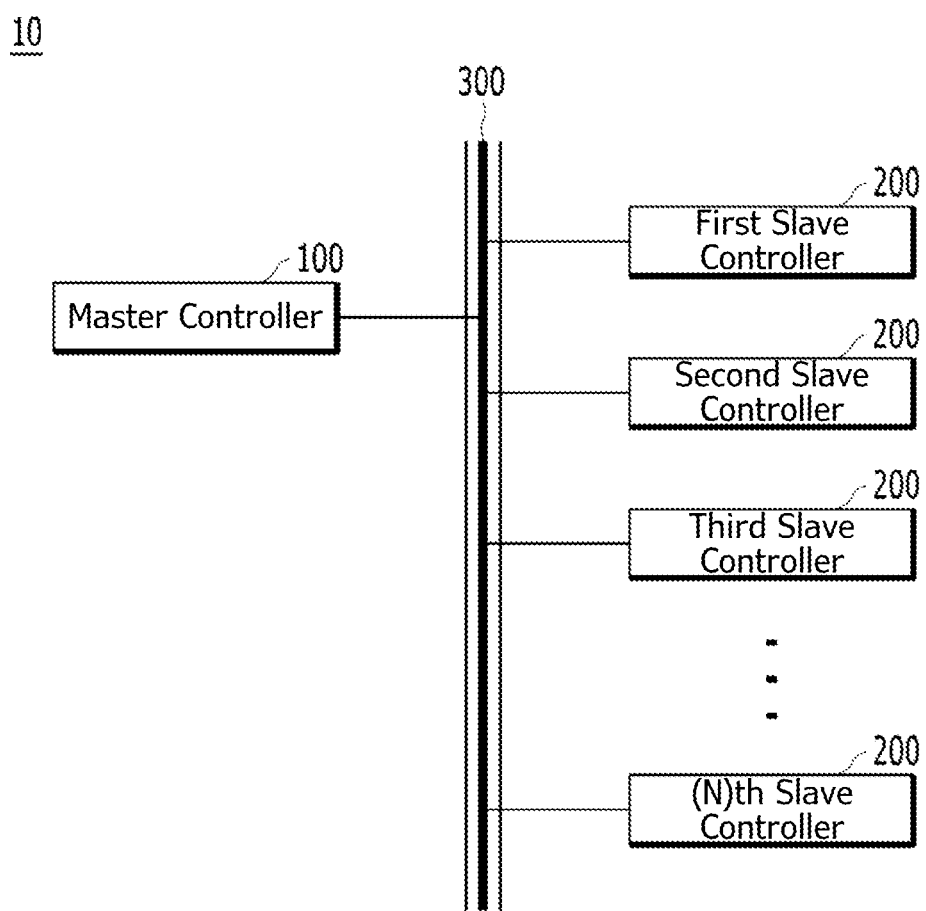
FIGS. 2 and 3 are diagrams for explaining an efficient communication bus arbitration system according to an embodiment of the present disclosure.
Figure 3:
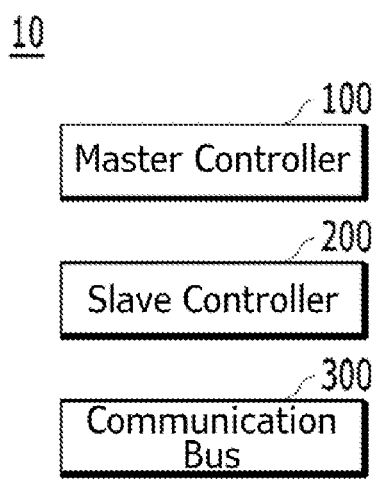

FIGS. 2 and 3 are diagrams for explaining an efficient communication bus arbitration system according to an embodiment of the present disclosure.

Referring to FIGS. 2 and 3, an efficient communication bus arbitration system 10 includes a master controller 100, a slave controller 200 and a communication bus 300.

The master controller 100 may apply the identifier (ID) of the slave controller 200 to the communication packet and communicate with each slave controller 200. For example, the master controller 100 may use the identifier of the slave controller 200 to determine the order in which the slave controller 200 responds.

There is a plurality of slave controllers 200, and each has an identifier (ID). When the slave controller 200 receives a communication packet including identifier (ID) information from the master controller 100, it does not unconditionally transmit a response packet to the master controller 100, but listens to the responses of the other slave controllers 200 according to the order determined by the master controller 100, waits for its turn to respond and then responds. For example, a plurality of slave controllers 200 may transmit the packet of the slave of (m+1)th priority after confirming the response to the packet transmission of the slave of (m)th priority. The master controller 100 sequentially receives responses from the plurality of slave controllers 200 with a single query.

For simplicity, when it is assumed that the response packet of the slave controller is configured of header area+data area+tail area, conventionally, a plurality of slave controllers configure and transmit packets including all three areas, respectively. On the other hand, when the plurality of slave controllers 200 according to an embodiment of the present disclosure transmit the response packets, the first slave controller having the highest priority includes a header area and a data area, and the last (N)th slave controller includes a data area and a tail area. The second to (N−1)th slave controllers include only the areas other than the header area and the tail area.

The communication bus 300 connects the master controller 100 and the slave controllers 200 in a multi-drop method and transmits and receives packets. The master controller 100 and the slave controllers 200 communicate while transmitting and receiving packets through the communication bus 300. After confirming that a response packet to the packet transmission of the slave controller having the (m)th priority among the plurality of slave controllers 200 is transmitted, the communication bus 300 grants the right to use the communication bus 300 to the slave controller having the (m+1)th priority so that the slave controller 200 can transmit packets only when it is its turn to respond.

FIG. 4 are configuration diagrams of a related Sync Read packet for comparison with an efficient communication bus arbitration system according to an embodiment of the present disclosure.

Figure 4A:
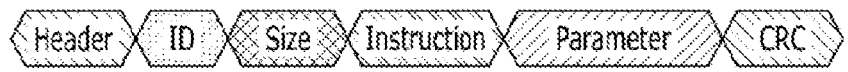
FIGS. 4A, 4B and 5 are configuration diagrams of a related Sync Read packet for comparison with an efficient communication bus arbitration system according to an embodiment of the present disclosure.

Referring to FIG. 4A, the packet structure used in the slave bus arbitration method uses the identifier (ID) of the slave controller 200. The master controller 100 communicates while distinguishing the identifier (ID) of the slave controller 200. The slave bus arbitration method can distinguish Sync Read and Bulk Read packets in order to efficiently read the table information of the plurality of slave controllers 200.

Figure 4B:
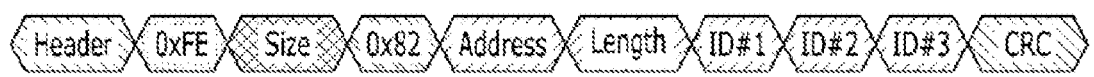
Figure 4B:
Figure 4B:
Figure 4B:

Referring to FIG. 4B, with the slave bus arbitration method, it is possible to check the Sync Read packet. The Sync Read packet used in the related slave bus arbitration method has a structure in which the header area, size, introduction, and tail area (CRC) appear repeatedly in the packets of all slave controllers. Compared to the data required by the master controller, the elements to construct a packet takes up a considerable proportion of the packet.

The slave bus method may reduce the search time of the slave controller, but considering a large proportion of the elements to construct the packets, it is required to transmit a larger amount of packets than the actual data that the slave controller needs to transmit.

Figure 5:
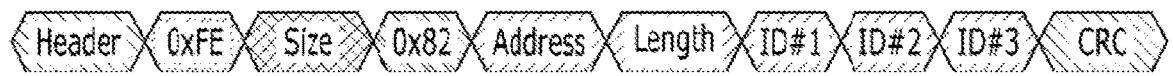
Figure 5:
Figure 5:
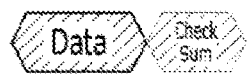
Figure 5:
Figure 6:
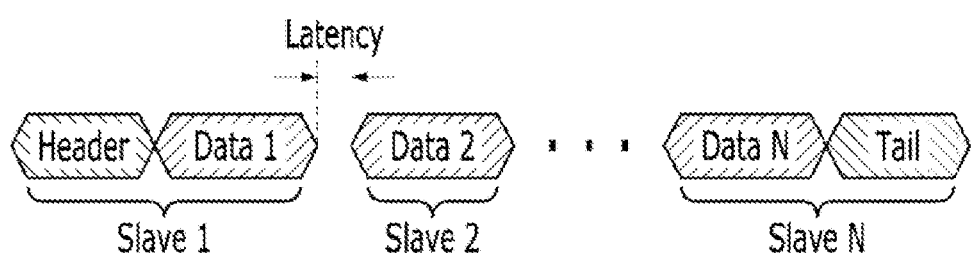
FIGS. 6 and 7 are diagrams for explaining an efficient communication bus arbitration system according to an embodiment of the present disclosure.

FIGS. 5 and 6 are diagrams for explaining an efficient bus arbitration system according to an embodiment of the present disclosure.

Referring to FIG. 5, a more efficient and faster communication speed can be provided by improving the related Sync Read packet.

Compared to FIG. 4B, with the improved Sync Read packet, the first slave controller includes a header area, and the last (N)th slave controller includes a tail area. The header area indicates the start of the packet, and the tail area indicates the end of the packet and depending on circumstances, may be used for integrity verification. For example, the tail area may be a CRC area for checking integrity. In addition, the second to (N−1)th slave controllers may transmit the packets without header and tail areas. When all the slave controllers respond quickly enough and so the latency time is less than the timeout time, the master controller can receive this as one packet concatenating the header and the tail. When the improved packet communication is actually implemented, the second slave controller may respond after confirming the response of the first slave controller. At this time, it is necessary to check the integrity of the data transmitted by the plurality of slave controllers. Therefore, each slave controller except for the last (N)th slave controller may add an area for checking integrity, such as a checksum, to the end of the responding packet.

Referring to FIG. 6, according to the improved Sync Read packet (see FIG. 3) according to an embodiment of the present disclosure, the first slave controller having the highest priority transmits a packet including the header area and the first data area as defined in the protocol. For example, the first slave controller may transmit a packet by concatenating the header area and the first data area. The second slave controller having the next priority may transmit the second data area immediately as the master controller receives the response of the first slave controller. At this time, the header area is not configured in the second slave controller. Until the last (N)th slave controller responds, the second to (N−1)th slave controllers may transmit the packets without header and tail areas. The (N)th slave controller, which is the last slave controller, includes the (N)th data area and the tail area and transmits the packet. For example, the last (N)th slave controller may transmit a packet by concatenate the (N)th data area and the tail area. When the packets sequentially transmitted by a plurality of slave controllers are concatenated as described above, from the viewpoint of the master controller 100, the structure is same as a complete packet received from one slave controller, and accordingly, it may use the same method as the method of processing a complete packet received from one slave controller. It is to be noted that the latency time that may occur between the slave and the slave packet should be shorter than the timeout time as defined in the protocol.

According to an embodiment of the present disclosure, when the packets transmitted by the plurality of slave controllers 200 except for the slave controller 200 of the highest priority and the slave controller 200 of the last priority are formed only of data, the total amount of packets to be transmitted is decreased, thereby providing a more efficient and faster communication speed.

Figure 7:
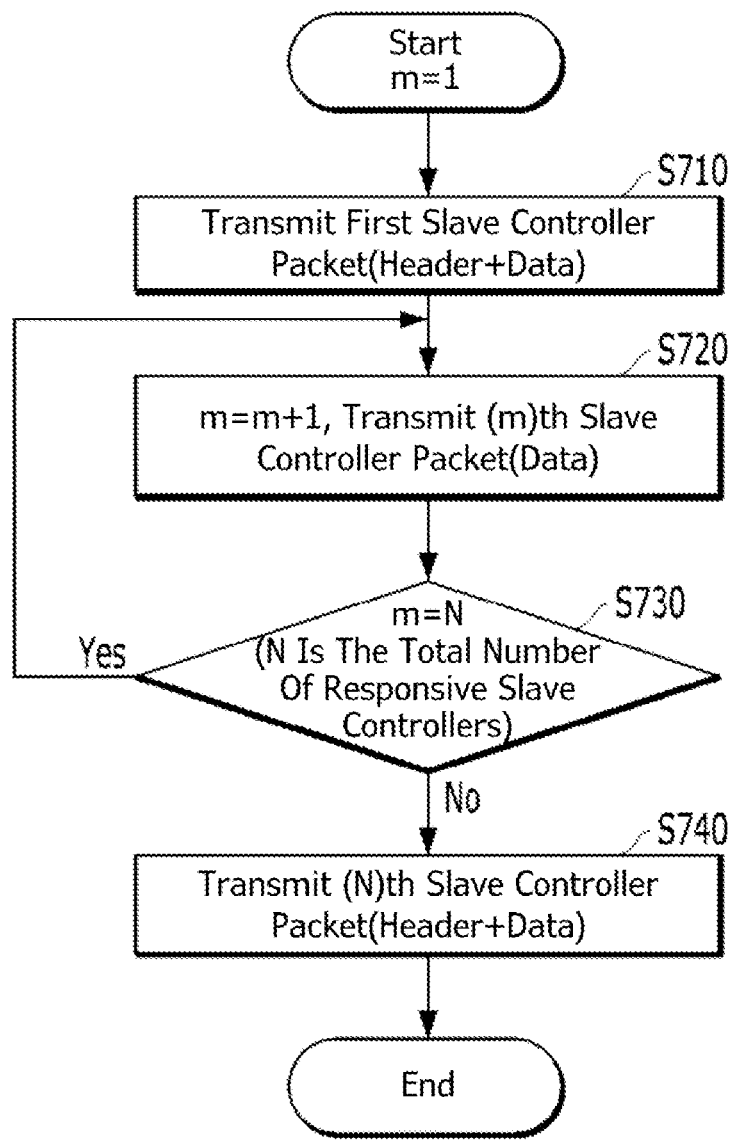

FIG. 7 illustrates a flowchart of a plurality of slave controllers transmitting response packets by the efficient communication bus arbitration system according to an embodiment of the present disclosure.

Referring to FIG. 7, the response packets of the plurality of slave controllers do not unconditionally include the header and tail areas. The first slave controller packet of the highest priority includes a header area, and the last and final (N)th slave controller includes a tail area. The remaining slave controllers do not include header and tail areas.

At S710, the efficient communication bus arbitration system 10 includes a header area and a data area and transmits the packet of the first slave controller that has the highest priority to respond.

When the packet transmission of the first slave controller is completed, at S720, the efficient communication bus arbitration system 10 excludes the header area and includes only the data area and transmits the packet of the second slave controller that has the next highest priority to respond. In this case, an integrity check area for integrity verification of the data may be further included.

At S730, the efficient communication bus arbitration system sequentially repeats the operation at S720 until the last (N)th slave controller. When it is the last (N)th slave controller, the operation at S740 is performed.

At S740, the efficient communication bus arbitration system 10 includes the data area and the tail area and transmits the packet of the (N)th slave controller that has the last priority to respond. In this case, the tail area may include information that can verify integrity.

The master controller 100 of the efficient communication bus arbitration system 10 may receive this as one packet concatenating the header and the tail.

The efficient bus arbitration method described above may be implemented as a computer-readable code on a computer-readable medium. The computer-readable recording medium may be a removable recording medium (CD, DVD, Blu-ray disk, USB storage device, removable hard disk) or a fixed recording medium (ROM, RAM, computer-equipped hard disk), for example. The computer program recorded on the computer-readable recording medium may be transmitted to the other computing devices through a network such as the Internet or the like and installed in the other computing devices, thereby being used in the other computing devices.

When it is described above that all components forming the embodiment of the present disclosure are combined or operated as one body, the present disclosure is not necessarily limited to such embodiment. That is, as long as it is within the scope of the present disclosure, one or more of those components may be selectively combined and operated.

Although operations are illustrated in a specific order in the drawings, it should not be understood as requiring that the operations be performed in the specific order or sequential order illustrated, or that all the illustrated operations be performed to obtain a desired result. In certain circumstances, multitasking and parallel processing may be advantageous. Moreover, separation of the various components in the embodiments described above should not be construed as necessarily requiring such separation, and it should be understood that the program components and systems described herein may generally be integrated together into a single software product or packaged into multiple software products.

The present disclosure has been mainly described above with respect to the embodiments thereof. Those of ordinary skill in the art to which the present disclosure pertains will understand that the present disclosure can be implemented in a modified form without departing from the essential characteristics of the present disclosure. Therefore, the disclosed embodiments should be considered in an illustrative rather than a restrictive sense. The scope of the present disclosure should be construed by the claims rather than the foregoing description, and all differences within the scope equivalent thereto should be construed to be included in the present disclosure.

Mode for Embodying Invention

The mode for embodying the invention has been described above in the best mode for embodying the invention.

INDUSTRIAL APPLICABILITY

The present disclosure relates to a system and method for efficient bus arbitration and has industrial applicability since it allows to expect efficient and fast communication by improving repeatedly occurring packets by reducing the number of occurrences of the header and tail areas in the slave bus arbitration communication.

What is claimed is:

1. An efficient communication bus arbitration system wherein a plurality of slave controllers sequentially transmit packets according to a predetermined priority, comprising:
   a plurality of slave controllers each having an individual identifier (ID);
   a master controller that applies the identifier (ID) of the plurality of slave controllers to a communication packet to communicate, uses the identifiers (ID) of the plurality of slave controllers to determine the order in which the plurality of slave controllers respond, and sequentially receives responses from the plurality of slave controllers with a single query; and
   a communication bus that connects the master controller and the plurality of slave controllers in a multi-drop method and transmits and receives packets,
   wherein:
   after confirming that a response packet to the packet transmission of a slave controller having a (m)th priority among the plurality of slave controllers is transmitted, the communication bus grants right to use the communication bus to another slave controller having a (m+1)th priority,
   the plurality of slave controllers respond to the master controller in a predetermined order,
   a first slave controller with a highest priority of the plurality of slave controllers transmits a packet including a header area and a first data area, second to (N−1)th slave controllers of the plurality of slave controllers transmit packets including second to (N−1)th data areas and an area for integrity check, respectively,
   a last (N)th slave controller of the plurality of slave controllers transmits a packet including an (N)th data area and a tail area, and
   wherein, when the plurality of slave controllers sequentially transmit packets and a latency time between packet transmissions is shorter than a timeout as defined in protocol, the master controller concatenates the packets received from the plurality of slave controllers to generate packets having a complete packet structure including the header area, a data area and the tail area.

2. An efficient communication bus arbitration method wherein a plurality of slave controllers sequentially transmit packets according to a predetermined priority, comprising:
   applying, by a master controller, identifiers (ID) of the plurality of slave controllers to a communication packet to communicate, using the identifiers (ID) of the plurality of slave controllers to determine the order in which the plurality of slave controllers respond, and sequentially receiving responses from the plurality of slave controllers with a single query;
   transmitting, by a first slave controller with a highest priority, a packet including a header area and a first data area;
   transmitting, by second to (N−1)th slave controllers, packets including second to (N−1)th data areas, respectively; and
   transmitting, by a last (N)th slave controller, a packet including an (N)th data area and a tail area,
   wherein the plurality of slave controllers sequentially transmit packets, and
   wherein, after confirming that a response packet to the packet transmission of a slave controller having a (m)th priority among the plurality of slave controllers is transmitted, the communication bus grants right to use the communication bus to another slave controller having a (m+1)th priority,
   wherein the packets received from the plurality of slave controllers have, when concatenated sequentially in order, a complete packet structure including a header area, a data area and a tail area like a complete packet received from one slave controller,
   wherein, in the transmitting by second to (N−1)th slave controllers the packets including second to (N−1)th data areas respectively, the packets further include an area for integrity check, and
   wherein, when the plurality of slave controllers sequentially transmit packets, a latency time between packet transmissions is shorter than a timeout as defined in protocol.

3. The efficient communication bus arbitration method according to claim 2, wherein the data area of the packets transmitted by the plurality of slave controllers further includes an identifier (ID), an address, and a size.

4. A non-transitory computer-readable recording medium storing a computer program for executing the method according to claim 2.

* * * * *